US011953189B2

(12) United States Patent
Hierzer

(10) Patent No.: US 11,953,189 B2
(45) Date of Patent: Apr. 9, 2024

(54) ADAPTER FOR A LIGHTING ARRANGEMENT

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 101 days.

(21) Appl. No.: 17/700,641

(22) Filed: Mar. 22, 2022

(65) Prior Publication Data

US 2022/0307679 A1 Sep. 29, 2022

(30) Foreign Application Priority Data

Mar. 25, 2021 (DE) ......................... 102021202973.6

(51) Int. Cl.

| | |
|---|---|
| ***H01R 25/14*** | (2006.01) |
| ***F21S 4/28*** | (2016.01) |
| ***F21V 23/06*** | (2006.01) |
| ***H01R 31/06*** | (2006.01) |
| ***H01R 35/04*** | (2006.01) |

(52) U.S. Cl.

CPC ................ *F21V 23/06* (2013.01); *F21S 4/28* (2016.01); *H01R 25/142* (2013.01); *H01R 31/06* (2013.01); *H01R 35/04* (2013.01)

(58) Field of Classification Search

None

See application file for complete search history.

(56) References Cited

U.S. PATENT DOCUMENTS 3,725,695 A 4/1973 Eversberg et al.
6,042,399 A * 3/2000 Jaakkola .............. H01R 25/142 439/122

(Continued)

FOREIGN PATENT DOCUMENTS

CN 212298686 U 1/2021
DE 2052752 C 4/1973

(Continued)

OTHER PUBLICATIONS

Search report in corresponding EP patent application EP 22 16 0633 dated Jul. 8, 2022 (pp. 1-2).

(Continued)

*Primary Examiner* — Tho D Ta

(74) *Attorney, Agent, or Firm* — Millen, White, Zelano & Branigan P.C.; William F. Nixon

(57) ABSTRACT

An adapter is introduced into a rail during formation of the lighting arrangement, to receive electrical energy from a conductor device provided in a region of the rail when the lighting arrangement is in an operating state, and to supply an assembly, which can be electrically coupled to the adapter during formation of the lighting arrangement, with electrical energy for the operation of light-generating devices in the operating state. The adapter comprises a rotational connector and can be electrically coupled by means of a rotational movement of the rotational connector to a plurality of electrical phases provided by the conductor device. The adapter comprises a device for phase selection, by means of which the assembly electrically coupled to the adapter can be electrically coupled to a selectable one of the phases provided by the conductor device and electrically coupled to the adapter.

20 Claims, 3 Drawing Sheets

(56) References Cited

U.S. PATENT DOCUMENTS

| | | | | |
|---|---|---|---|---|
| 9,845,942 | B2 | 12/2017 | Ladstaetter | |
| 10,690,329 | B2 | 6/2020 | Terumichi | |
| 2014/0049954 | A1 | 2/2014 | Ladstaetter | |
| 2020/0403362 | A1 * | 12/2020 | Terumichi | H01R 35/04 |
| 2022/0307662 | A1 * | 9/2022 | Hierzer | F21V 21/025 |
| 2022/0307676 | A1 * | 9/2022 | Hierzer | F21V 21/35 |

FOREIGN PATENT DOCUMENTS

| | | | | |
|---|---|---|---|---|
| DE | 4012803 | C2 | 5/1992 | |
| DE | 102011017702 | A1 | 10/2012 | |
| DE | 102012208297 | A1 | 11/2013 | |
| DE | 102015112838 | A1 | 2/2017 | |
| DE | 102014205892 | B4 | 7/2018 | |
| DE | 202018106674 | U1 | 2/2020 | |
| DE | 202018106674 | U1 | 4/2020 | |
| EP | 2330694 | A2 * | 6/2011 | H01R 25/142 |
| EP | 1956291 | B1 | 11/2012 | |
| EP | 3128223 | A1 | 2/2017 | |
| WO | 2018128170 | A1 | 7/2018 | |

OTHER PUBLICATIONS

Search report dated Jul. 19, 2022 in corresponding Austrian application 50242/2021 (1 page).

* cited by examiner

ADAPTER FOR A LIGHTING ARRANGEMENT

FIELD OF THE INVENTION

The invention relates to an adapter for a lighting arrangement, in particular for a lighting arrangement based on a rail system, e.g. for the purpose of lighting in buildings.

TECHNICAL BACKGROUND

Lighting arrangements based on rail systems, for instance for lighting purposes in buildings, are already known. For example, systems have already been proposed, in which electrical conductors are integrated into a rail profile to provide a supply voltage and control signals. Such rail systems include e.g. a number of light insets of a different type, e.g. spotlights or linear light insets, which can also be combined.

Although conventional rail systems already offer an advantageous, high degree of flexibility in relation to the design of a lighting solution adapted to individual circumstances, it has been shown that in the structure and operation of such lighting arrangements, a further improvement in flexibility, in particular in relation to the electrical power supply would be desirable.

SUMMARY OF THE INVENTION

On the basis of this background, the object of the invention is that of further improving a lighting arrangement with respect to its flexibility in operation and structure, preferably in a relatively simple and economical manner.

This object is achieved in accordance with the invention by an adapter for a lighting arrangement having the features of claim 1.

An adapter for a lighting arrangement is proposed, which is designed to be introduced into a rail during formation of the lighting arrangement, to receive electrical energy from a conductor device provided in a region of the rail when the lighting arrangement is in an operating state, and to supply an assembly—which can be electrically coupled to the adapter during formation of the lighting arrangement—with electrical energy for the operation of light-generating devices in the operating state. In this case, the adapter comprises a rotational connector and can be electrically coupled by a rotational movement of the rotational connector to a plurality of electrical phases provided by the conductor device. Furthermore, in this case, the adapter comprises a device for phase selection, by means of which the assembly electrically coupled to the adapter can be electrically coupled to a selectable one of the phases provided by the conductor device and electrically coupled to the adapter.

A concept forming the basis of the invention consists of equipping the adapter, which can be introduced into the rail, for selection of the phase to be used. In this way, an improved modular structure for a rail lighting system can be achieved. In particular, the capability of selecting the phase to be used, which is integrated into the adapter, means that the assembly can be designed in a simple and space-saving manner. The capability of selectively using one of the available phases contributes to flexible and multi-faceted operation of the lighting arrangement.

Advantageous embodiments and developments of the invention are apparent from the further dependent claims and from the description with reference to the figures.

For example, in some developments, the adapter can be freely positioned along the rail. This contributes to flexibility in the structure of the lighting arrangement.

In one embodiment, the rotational connector can be rotated about an axis of rotation in order to bring about or discontinue the electrical coupling of the adapter to the phases provided by the conductor device, this axis of rotation extending substantially parallel to a depth direction of the rail or in this depth direction when the adapter is in an operation-ready installation state. In this way, good accessibility for an operator to the rotational connector and effective coupling of the adapter to the phases can be achieved while having a simple structure for the rotational connector.

In one embodiment, the rotational connector can be rotatable within an angular range which is of a magnitude in the range of about 60 degrees to about 90 degrees, in particular in the range of about 60 degrees to about 70 degrees. However, in other embodiments, a different turning range for the rotational connector is feasible.

In one embodiment, by means of a rotational movement of the rotational connector, the adapter can be electrically coupled simultaneously to the plurality of electrical phases provided by the conductor device. Such coupling is simple and efficient.

In one embodiment, the device for phase selection is arranged for electronic selection of the phases to be coupled to the assembly. This can contribute to a reduction in the number of movable components and an increase in the reliability of the device and ease of using the adapter.

In one embodiment, a selection device which can be actuated by an operator is provided on one side, in particular a lower side, of the adapter, which points towards an open region of the rail when in a state in which the adapter is inserted into the rail. The selection device can be designed in particular as a button or push-button switch. By actuation of the selection device, the electrical phase to be electrically coupled to the assembly can be selected or changed and/or the adapter can be brought into a state in which none of the phases provided by the conductor device and electrically coupled to the adapter is selected for electrical coupling to the assembly. Such a selection device is easily accessible. An operator can therefore comfortably manually select the phase to be used at the adapter e.g. by actuating the selection device once or a number of times and/or the adapter can be brought into an "off" state in which all phases coupled to the adapter are decoupled from the assembly.

In one development, the adapter comprises a display device, by means of which the phase—selected for electrical coupling to the assembly—of the phases provided by the conductor device and electrically coupled to the adapter can be displayed.

In one development, the display device is disposed on the side, in particular the lower side, of the adapter pointing towards an open region of the rail when the adapter is in the state inserted into the rail. In particular, the display device of the actuatable selection device can be disposed adjacent to the adapter. Therefore, the display device is clearly visible to the operator, in particular during actuation of the selection device.

The display device can be formed e.g. with a plurality of light-emitting diodes or LEDs, wherein preferably one LED is provided for each phase which is provided by the conductor device and can be coupled to the adapter. For example, provision can be made that the LED allocated to the currently selected active phase lights up while the other LEDs are unlit. An operator can therefore quickly and easily see whether a phase is selected and active, and if so, which one.

According to one embodiment, the adapter comprises a converter, wherein, by means of the device for phase selection, the coupling of the assembly to the selectable phase can be brought about in such a way that the converter is coupled to the selectable phase in order to provide the electrical energy for the assembly using the selected phase. Therefore, the functions of the converter and the phase selection in the adapter can be combined, wherein the adapter can be inserted and placed into the rail as a unit separately from the assembly. Components for converting electrical current are therefore not required within the assembly, whereby this can in turn be of lighter, smaller and simpler construction.

Furthermore, in one embodiment, by means of the adapter a control signal can be transmitted to the assembly and/or the assembly can be actuated on the basis of a control signal received from the adapter.

According to one development, the adapter can be arranged to receive the control signal from the conductor device and to relay it to the assembly. Therefore, the control signal is made available to the assembly and can be processed and/or interpreted e.g. in the assembly itself.

According to another development, the adapter can be arranged to receive the control signal from the conductor device, wherein the adapter is designed with an electronic arrangement which makes it possible to interpret the received control signal and, in dependence upon the received control signal, to form a signal to be transmitted to the assembly in order to control the assembly. Therefore, the interpretation of the control signal applied to the conductor device can take place within the adapter, thus obviating the need for corresponding devices at a downstream location, e.g. in the assembly.

In one embodiment, the rotational connector comprises a plurality of contact elements. In this case, the contact elements can be moved by means of the rotational movement from a non-contacting position into a protruding contacting position, in which conductors of the conductor device can each be contacted by one of the contact elements. In particular, in this case, the contact elements are movable jointly and simultaneously by means of the rotational movement between the non-contacting position and the contacting position. This makes possible simple, effective and reliable production of contact with the conductors.

According to one embodiment, the rotational connector comprises a rotatable body, wherein the contact elements are disposed on the rotatable body. In particular, two groups of contact elements can be formed, wherein the groups are disposed in a diametrically opposite manner on the rotatable body.

In one development, the conductors comprise a plurality of phase conductors and in particular also a neutral conductor.

In one development, the conductors comprise one or a plurality of control signal conductors, in particular two control signal conductors. In this way, the control signal, e.g. a DALI signal, can be provided in an advantageous manner.

In one embodiment, the conductors of the conductor device are located laterally of the adapter in a state where the adapter is inserted into the rail.

According to one embodiment, provision can be made for positions of the conductors of the conductor device to be substantially symmetrical to a longitudinal middle plane of the rail and/or for conductors of the conductor device, formed as control signal conductors, to be disposed opposite each other with respect to the longitudinal middle plane of the rail.

In one embodiment, the assembly to which the adapter can be electrically coupled is designed as a lighting module.

According to another embodiment, at least one lighting unit is, or can be, coupled to the assembly, and/or at least one lighting unit is, or can be, at least partially accommodated by the assembly.

In one embodiment, the adapter can be introduced into the rail from a lower side thereof when the rail is in the intended mounted state, in particular it can be introduced transversely to a longitudinal direction of the rail. This facilitates insertion of the adapter.

In one embodiment, the adapter is a component of a rail lighting system. In this way, the adapter can contribute to an increase in flexibility and versatility in construction and operation of the rail lighting system.

The above embodiments and developments can be combined with each other in any manner if it is useful to do so. Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the present invention.

CONTENT OF THE DRAWINGS

The invention will be explained in more detail hereinafter with the aid of the exemplified embodiments shown in the schematic figures of the drawings. In the drawings.

Figure 1:
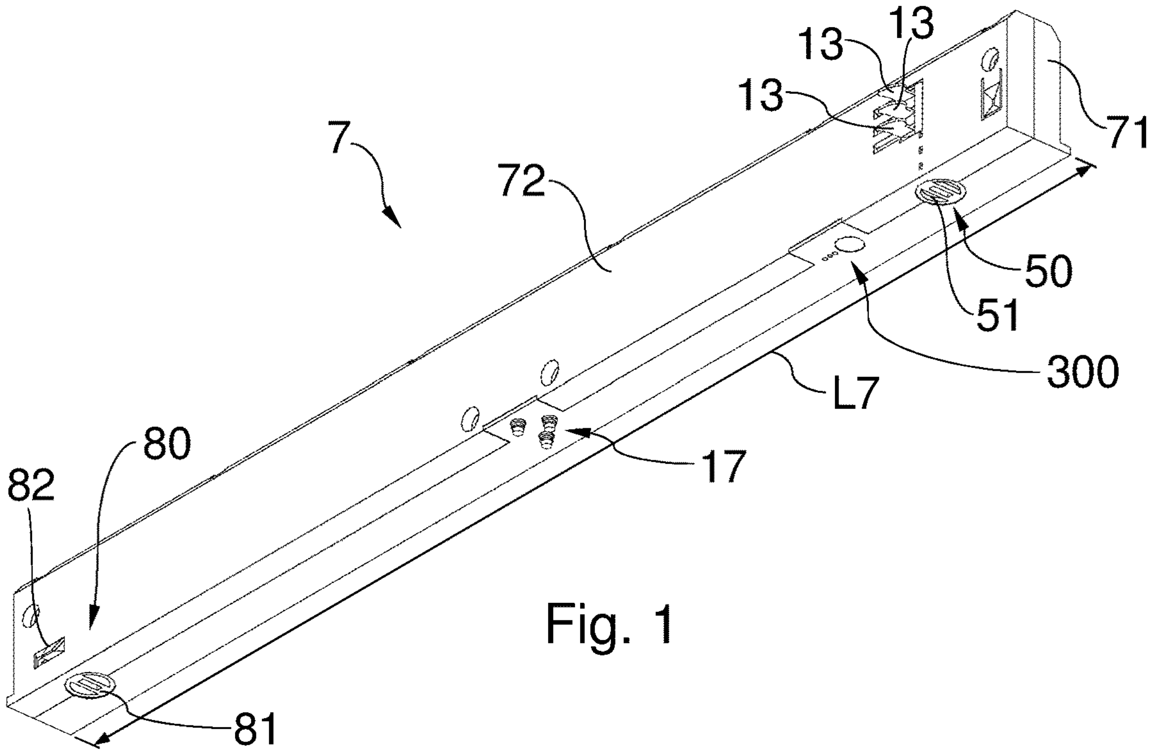
FIG. 1 shows a perspective view of an adapter according to one exemplified embodiment.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures, like and functionally identical elements, features and components and elements, features and components acting in an identical manner are provided with the same reference signs, unless indicated otherwise.

Description of Exemplified Embodiments

FIGS. 1-3 and 4-7 show an adapter 7 for a lighting arrangement according to one exemplified embodiment. The lighting arrangement is formed having components which are part of a rail lighting system. In the rail lighting system, assemblies 2 selectively designed e.g. as lighting modules 11 and/or as low-voltage rails, not shown in detail, and/or as spotlights, also not shown, can be accommodated and combined in a rail 3. For example, further lighting units can be coupled to the low-voltage rails.

The rail 3 can be designed for installation in a ceiling, mounting on a ceiling and/or suspension from the ceiling of a room or from another construction.

The rail lighting system therefore permits accommodation of assemblies for lighting purposes in a rail 3 which can be designed, e.g. as in the figures, as a three-phase rail, alternatively as a five-phase rail, or as a rail with another number of phases.

Figure 4:
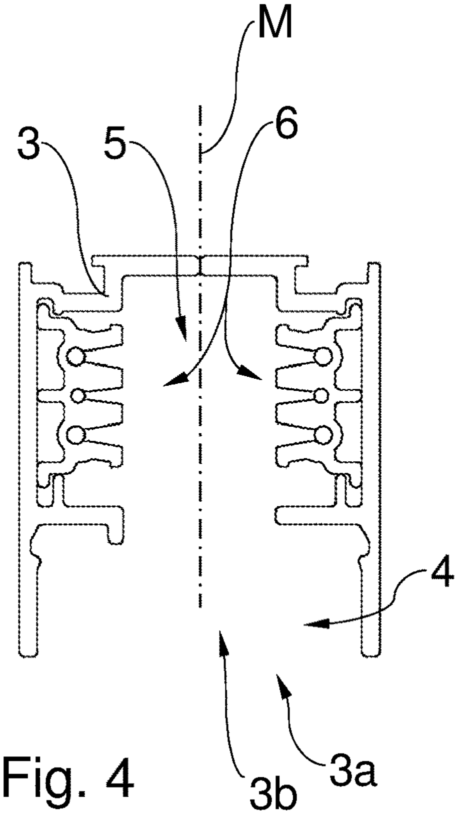
FIG. 4 shows an end-face view of a rail of a lighting arrangement in which the adapter can be used.
Figure 5:
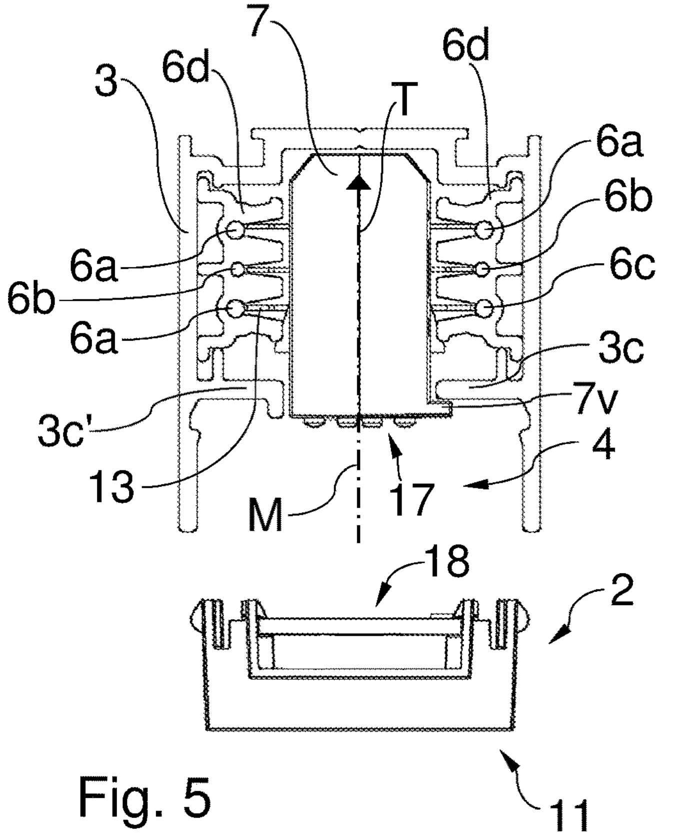
FIG. 5 shows the rail of FIG. 2, the adapter of FIG. 1 inserted into the rail, and a lighting module which can be inserted into the rail.
Figure 2:
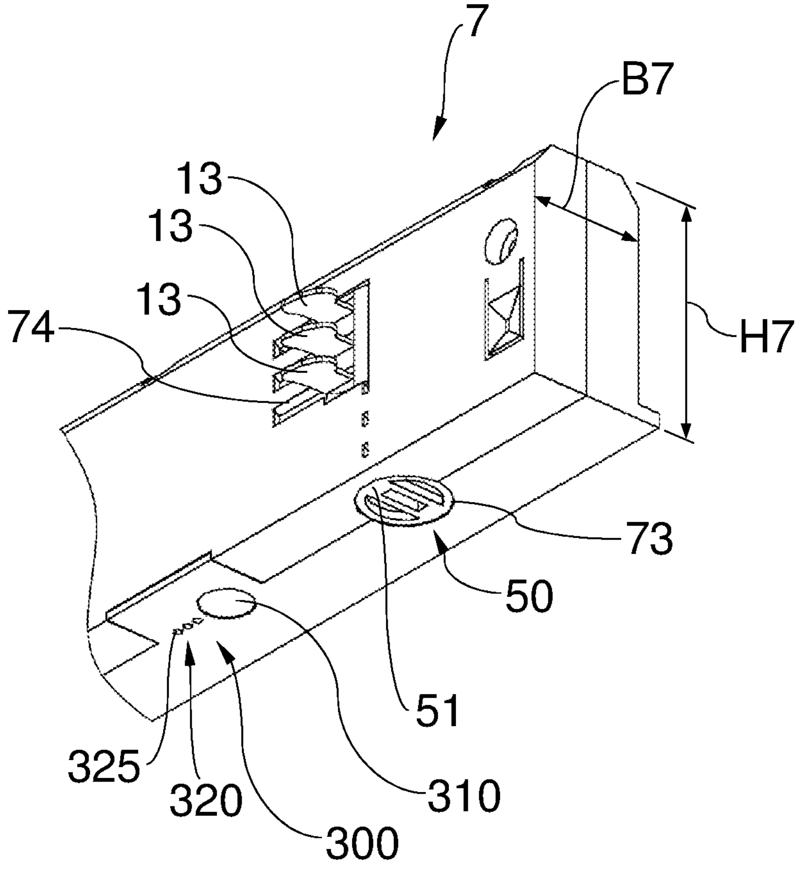
FIG. 2 shows an end portion of the adapter according to the exemplified embodiment of FIG. 1 in an enlarged perspective view.
Figure 3:
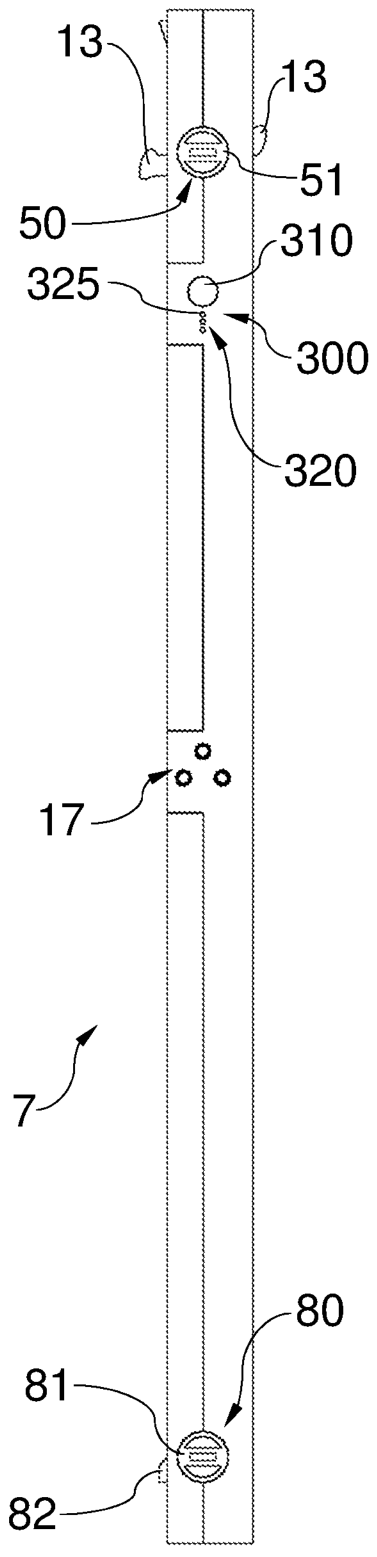
FIG. 3 shows the adapter of FIG. 1 from below.

The rail 3, see FIGS. 4 and 5, is designed with an extruded profile from a metal material, e.g. an aluminium material, and with a two-part conductor device 6.

The rail comprises a web in its cross-section and flanges or side walls connected by the web. In the state e.g. mounted on a ceiling, one side 3*a* is a lower side of the rail 3 in FIG. 4, wherein the rail 3 is designed with an open region 3*b* on the lower side 3*a*. By means of longitudinal ribs 3*c*, 3*c*' of the profile protruding into an inner space of the rail 3, an inner region 5 of the rail 3 and a further outer region 4 are formed. The region 4 is adjacent to the side 3*a*, merges into the open region 3*b* and is located between the lower side 3*a* and the inner region 5. In the mounted state, the inner region 5 is therefore an upper region and the region 4 is a lower region of the inner space of the rail 3.

The conductor device 6 is designed with two basic bodies 6*d* disposed laterally in the region 5, each basic body 6*d* accommodating three conductors. In detail, see FIG. 5, the conductor device provides three phase conductors 6*a*, a neutral conductor 6*c* and two control signal conductors 6*b*.

The conductors 6*a, b, c* are positioned in the cross-section of the rail 3 substantially symmetrically to a longitudinal middle plane M of the rail 3. The control signal conductors 6*b* each correspond to the middle conductors on each of the basic bodies 6*d* and are disposed in a mutually opposing manner with respect to the longitudinal middle plane M.

The conductors 6*a*, 6*c* serve to provide electric current, in particular alternating current at a mains voltage, at a nominal voltage of e.g. about 220-240 V, e.g, 230 V, and a mains frequency of e.g. 50 Hz. This can be referred to by the term "high voltage".

For example, a DALI-signal for control purposes is provided by means of the conductors 6*b*. However, a control signal based on other control or dimming methods is likewise feasible.

FIG. 5 shows by way of example an assembly 2 which is designed as a lighting module 11 and contains light-generating devices, in particular LEDs. Provision is made in the rail lighting system for the illuminating components, illustrated e.g. by the lighting module 11, to be operated with electrical energy at a substantially lower voltage than that applied to the conductors 6*a, c*, such as at a direct voltage of less than 60V, e.g. at 48V. This should be referred to as "low voltage".

In order to form the lighting arrangement, the adapter 7 is introduced into the inner region 5 from the lower side 3*a* of the rail 3 through the open region 3*b*, and is largely accommodated in the inner region 5, see FIG. 5, wherein, when the adapter 7 is in the inserted state, the conductors 6*a*, 6*b*, 6*c* are located laterally of the adapter 7 on both sides. With the rail 3 in the mounted state, the adapter 7 can therefore be inserted from below and transversely to a longitudinal direction of the rail 3 perpendicular to the image plane in FIGS. 4, 5.

The assembly 2 shown by way of example in FIG. 5 is designed in such a way that it can be inserted into the region 4 of the rail 3 below the adapter 7. The assembly 2 can be mechanically coupled to the rail 3 e.g. by means of a releasable clipping-in or latching-in action, wherein the assembly 2 is thereby preferably held on the rail 3 in such a way that the assembly 2 can still be pushed along the rail 3 in the longitudinal direction thereof.

Furthermore, the assembly 2 can be electrically coupled to the adapter 7 in order to supply the assembly 2 with electrical energy for operation thereof and to control the assembly 2. For this purpose, a contact device 17 is provided on the adapter 7 and can be brought into an operative connection with a contact device 18 of the assembly 2.

The assembly 2 is not necessarily formed as in FIG. 5 but rather can be designed e.g. as a low-voltage rail, not shown in the figures, to which the low-voltage lighting units can again be coupled.

The adapter 7 essentially has the basic shape of an elongate cuboid with long edges which are bevelled on the side thereof which faces upwards towards the web of the rail 3 in the installed state. In this case, the adapter 7 is of a slender and space-saving design. For example, see FIG. 2, a height H7 of the adapter 7 can be approximately H7=28 mm and a width B7 of the adapter 7 can be approximately B7=14 mm. In particular, the ratio H7/B7 is thus approximately 2. A length of the adapter 7, see FIG. 1, can be approximately L7=300 mm. It is understood that in variants, deviations from these values for H7, B7 and/or L7 are possible, e.g. H7, B7 and/or L7 could each deviate by 2 mm upwards or downwards from said values.

The adapter 7 comprises a holding device 80 for mechanically securing the adapter 7 in the region 5, wherein a holding element 82 can engage behind a longitudinal rib 3*c*' of the rail 3, e.g. can latch-in behind it, and, in order to release the attachment, the holding element 82 can be retracted into a housing of the adapter 7 with the housing components 71, 72 by means of a mounting-rotational element 81 using a screwdriver.

In an operating state of the lighting arrangement, the adapter receives electric current from the conductor device 6, converts it by means of a converter 90 provided in the adapter 7 and, via contact elements of the contact devices 17, 18, provides low voltage to the assembly 2 for the operation of light-generating devices such as in particular LEDs.

The adapter 7 is equipped with a rotational connector 50 which comprises a rotatable body 51 disposed in the adapter housing formed with the parts 71, 72. The body 51 is rotatably accommodated in the adapter housing in such a way that the body 51 can be turned about an axis of rotation D within an angular range. The angular range can be of a magnitude of between about 60 degrees and about 65 degrees or of between about 60 degrees and about 70 degrees. When the adapter 7 is in the operation-ready, inserted state, the axis of rotation D extends substantially parallel to a depth direction T of the rail 3 and therefore substantially perpendicular to a longitudinal direction of the rail 3.

Figure 8:
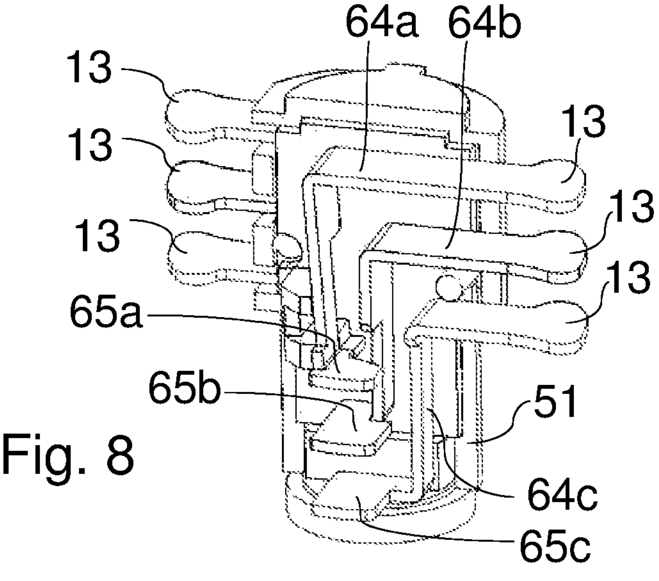
FIG. 8 shows a partially broken-away view of a rotatable body of a rotational connector of the adapter of FIG. 1, with contact elements.

The rotational body 51 comprises, see e.g. FIG. 8, a basic shape which is formed essentially with two approximately cylinder-like portions and can therefore be accommodated in a space-saving manner.

By turning, by means of a screwdriver, the rotational body 51 from a lower side of the adapter which is accessible through the region 3*b* when the adapter 7 is in the inserted state, the adapter 7 is electrically coupled simultaneously to the conductors 6*a*, 6*b*, 6*c* provided by the conductor device 6 and therefore to the three phase conductors, the neutral conductor and the control signal conductors.

In the exemplified embodiment, the rotational connector 50 comprises six contact elements 13 which are disposed on the body 51 in two groups of three contact elements 13 each, wherein the two groups protrude from the rotatable body 51 in a diametrically opposing manner. By turning of the body 51, the contact elements 13 can be moved simultaneously and jointly between a non-contacting position pivoted into the housing with the parts 71, 72 and a contacting position protruding out of the housing, shown in FIGS. 1-3, 5-7. In the contacting position, each of the contact elements 13 contacts one of the conductors 6*a*, 6*b*, 6*c*, see FIG. 5.

The rotational movement of the rotational connector 50 means that not only can electrical coupling of the adapter 7 to the three-phases but also, at the same time, electrical coupling of the adapter 7 to the neutral conductor 6*c* and to the control signal conductor 6*b* can be brought about. In particular, when the contact elements 13 are in the contacting position, each of the control signal conductors 6*b* can be contacted by one of the contact elements 13.

Each of the contact elements 13 is stamped and bent e.g. from sheet metal as a portion of an electrically conductive component which is formed from a metal material which has good electrical conductivity. See FIG. 8 in which three such electrically conductive components are designated by 64*a*, 64*b*, 64*c*, wherein it will be understood that three similarly electrically conductive components are provided for the three other contact elements. The components 64*a*-*c* are held in the body 51 which is formed from one or more parts and e.g. is of an insulating synthetic material.

Figure 7:
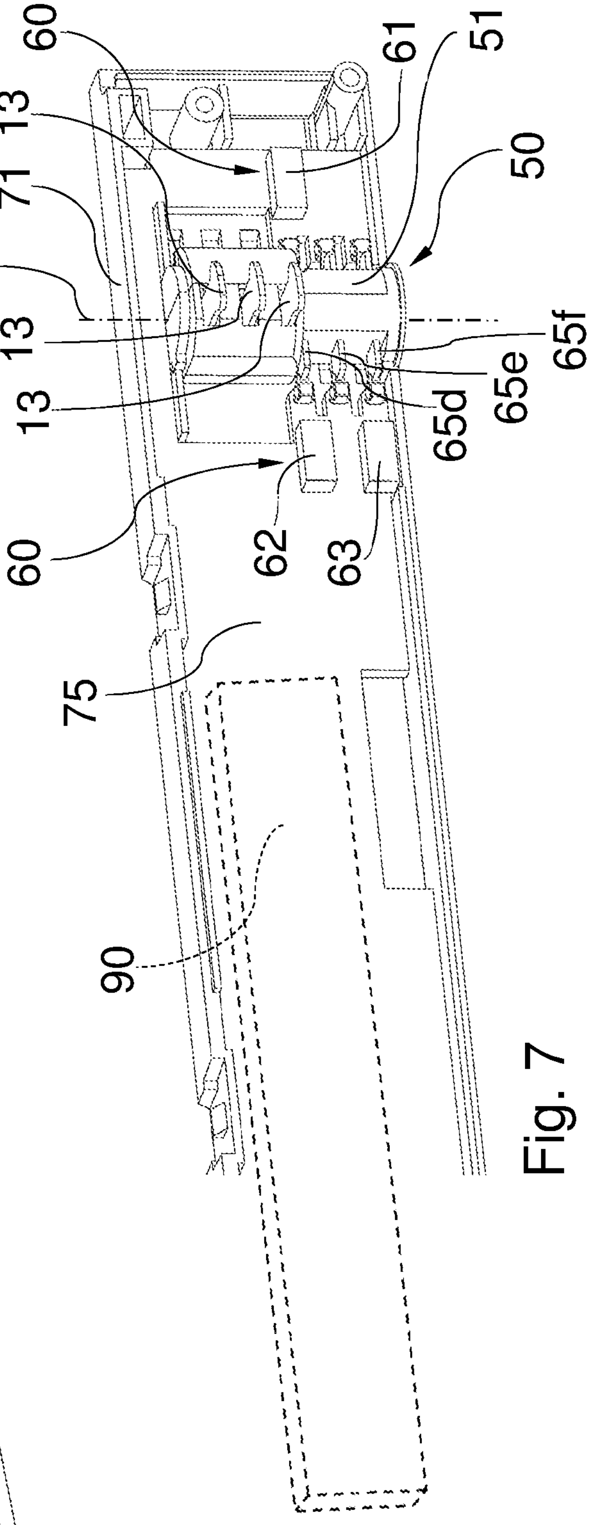
FIG. 7 shows a further partial perspective view of some components of the adapter of FIG. 1.

An end portion of each of the components 64*a*-*c*, which is in each case a lower end portion in FIG. 8, forms a further contact element 65*a*, 65*b* or 65*c*. The further contact elements 65*d*, 65*e*, 65*f*, see FIG. 7, are not shown in FIG. 8 but are formed in a similar manner. The elements 13 and the respectively allocated element 65*a*-*f* are formed as one piece with each other as a portion of the respective electrically conductive component, shown as components 64*a*-*c*.

Figure 6:
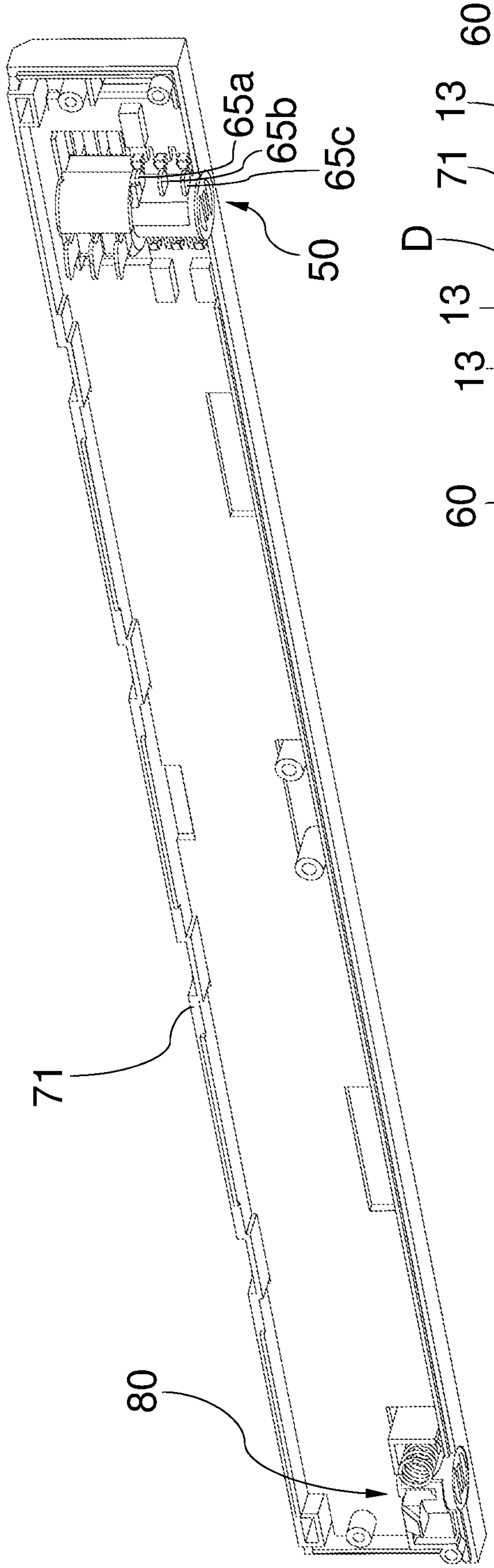
FIG. 6 shows a perspective view of some components of the adapter of FIG. 1.

In the contacting position of FIGS. 6, 7, the contact elements 65*a*-*f* contact allocated contact devices on a board 75 of the adapter 7 in order to produce an electrically conductive connection of the contact elements 13 in each case with electrical and/or electronic components on the board 75. The production of the contacts by means of the elements 13 with the conductors 6*a*-*c*, and by means of the elements 65*a*-*f* with the contact devices on the printed circuit board 75, is effected substantially simultaneously during turning of the body 51.

For example, the contact elements 13 respectively connected to one of the contact elements 65*a*, 65*d*, 65*f* can each be provided for the contacting of a phase conductor 6*a*, the element 13 connected to the contact element 65*c* can be provided for the contacting of the neutral conductor 6*c*, and the elements 13 respectively connected to one of the middle contact elements 65*b*, 65*e* can be provided for the contacting of the control signal conductors 6*b*.

In the illustrated exemplified embodiment, the rotational connector can preferably be turned through an angle of about 60 degrees between the operating state, i.e. the contacting position, in which the contact elements 13 contact the conductors 6*a*-*c*, and a non-contacting position in which the adapter 7 is completely separated from the conductor device 6 and can be removed from the rail 3.

The rotational connector 50, accommodated in the housing with the housing components 71, 72, with the associated contact elements renders possible the functionality described herein in a space-saving manner. For access in order to actuate the rotational connector 50 from below and for the pivoting-out of the contact elements 13, the housing components 71, 72 are provided with apertures or openings 73, 74.

The adapter 7 comprises a device 60 for phase selection which is formed as an arrangement with electrical and/or electronic components 61, 62, 63 on the board 75. By means of the device one of the electrical phases provided by the phase conductor 6*a* can be electrically coupled to the assembly 2, which is inserted into the region 4, for operation thereof. For this purpose, the device 60 is designed to bring the converter 90 into electrical connection with a selectable one of the phases at the conductors 6*a*—which are all contacted simultaneously by a respective contact element 13—in such a way that the converter 90 supplies the assembly 2 with electrical energy at low voltage on the basis of the selected phase. The device 60 can additionally be arranged to separate the converter 90 selectively from all three provided phases, whereby the adapter 7 is brought into an "off" state. The selection of the phase to be used by the converter 90 is made in particular electronically.

A selection device 310 is provided as an actuatable button or push-button switch in an operating and display region 300 on a lower side of the adapter 7, which, in the state in which this is inserted, points towards the open region 3*b*. By the operator pressing the button or push-button switch once or a number of times, a manually initiated phase selection, and thus a change in the phase currently selected for the electrical coupling to the assembly 2, can be brought about. If, in the case of a three-phase rail 3 corresponding to the illustrated exemplified embodiment, the respectively active phase, i.e. that to be coupled to the assembly 2, is designated by (L1), (L2) and (L3) respectively, and a state in which, by means of the adapter 7, electrical coupling to all phases made available by the conductor device 6 and contacted via contact elements 13 is prevented is designated by (OFF), then repeated pressing of the selection device 310 makes it possible to run through the following state sequences e.g. as an alternative:

. . . →(L1)→(L2)→(L3)→(L1)→(L2)→(L3)→(L1)→ . . . , or

. . . →(L1)→(L2)→(L3)→(OFF)→(L1)→(L2)→(L3)→(OFF)→(L1)→ . . .

The sequence mentioned second above makes possible electrical separation of all phases contacted via elements 13 from the converter 90 and therefore from the assembly 2, if this is used, in the (OFF) state. However, other sequences are likewise feasible.

Furthermore, in the operating and display region 300, the adapter 7 comprises a display device 320, by means of which the phase selected for the electrical coupling to the assembly 2 is visibly displayed to the operator. The display device 320 is designed with three small LEDs 325, which are disposed on the lower side of the adapter 7 adjacent to the selection device 310. By means of the LEDs 325, the currently active phase is displayed in that the LED allocated to the selected phase lights up and the others are unlit. In the (OFF) state all the LEDs 325 can be unlit.

By arranging the selection device 310 on the lower side of the adapter 7 this display device can be easily reached by the operator from below when the adapter 7 is inserted but the assembly 2 has not yet been introduced into the region 4 below the adapter 7. In addition, the display device 320 adjacent to the device 310 is clearly visible in this state.

During construction of the lighting arrangement it is therefore possible e.g. to proceed in such a manner that the adapter 7 is inserted at the desired position in the region 5 and the mechanical securing is effected by means of the holding device 80 and the electrical coupling is effected by means of the rotational connector 50 e.g. using a screw-driver. Before the assembly 2 is inserted and the adapter 7 covered as seen from the visible side 3*a*, the operator can select the desired phase to be used using the selection device 310.

The adapter 7 can be inserted into the region 5 at a selectable position along the rail 3 and can in particular be freely positioned. In a state in which the elements 13 are brought into their contacting position, i.e. when the adapter 7 is e.g. in the operation-ready state, the contact of the elements 13 with the conductors 6*a-c* opposes easy displacement of the adapter 7. For displacement of the adapter 7, the contact elements 13 are moved out of the contacting position and preferably into the non-contacting position pivoted into the housing components 71, 72.

FIGS. 4 and 5 show that the adapter 7 has a protrusion 7*v* on a longitudinal edge adjoining the underside of the adapter 7 facing the region 4 in the inserted state, which protrusion abuts the longitudinal rib 3*c* when the adapter 7 is in the correctly inserted state. The other longitudinal rib 3*c*', unlike the longitudinal rib 3*c* which is flat on a side facing the region 4, has an additional end section protruding towards the region 4. This end section causes the adapter 7 to be introduced to a lesser extent into the region 5 in the inverted orientation, i.e. with the protrusion 7*v* abutting against the longitudinal rib 3*c*', than in the correct position of FIG. 5. Therefore, electrical coupling to the conductor device 6 can be avoided in an incorrect insertion position of the adapter 7. For the operator, insertion of the adapter 7 in an incorrect position can also be recognised in this manner.

In addition, the control signal applied to the conductors 6*b* can be received by means of the adapter 7. In a first variant, the adapter 7 can be arranged to relay the control signal to the assembly 2 in unchanged form, in particular in the case where the assembly 2 is designed with a low-voltage rail (not shown in the figures) and lighting units coupled to said rail and then individually controllable by means of the relayed control signal.

In a second variant, adapter 7 can comprise an electronic arrangement which makes it possible to interpret the control signal received by the adapter 7 from the conductor device 6. In dependence upon the received control signal, the adapter 7 can in this case actuate the assembly 2, e.g. the adapter 7 can form a signal for control of the assembly 2.

In the exemplified embodiment illustrated in the figures with the linear lighting module 11 as assembly 2, the control signal, such as the DALI signal, which is provided at the conductors 6*b*, is interpreted by means of the electronic arrangement of the adapter 7, the conversion of the control signal therefore takes place in the adapter 7, wherein the adapter 7 converts the selected phase by means of the converter 90 as described above. The energy supply and control of the lighting module 11 takes place via the contact device 17.

In the exemplified embodiment, the contact device 17 is equipped with three punctiform, in particular pin-like or pin head-like, contact elements, wherein the contact device 18 can also comprise e.g. three contact elements which can each be brought into conductive contact with one of the contact elements of the device 17. In the exemplified embodiment, the three pin contacts of the device 17 on the adapter 7 serve to create the option of a so-called "Tunable White", wherein the pin contacts provide positive and negative current contacts for this purpose. In this case, the contact device 17, 17*a* has the following configuration of the three contact elements: first contact element positive (cold); second contact element positive (warm); third contact element negative.

In one variant, in which the "Tunable White" option is not available, it may be sufficient to provide the contact devices 17, 18 each with only two contact elements, with the configuration: first contact element positive, second contact element negative.

It should be mentioned that in the case of the use of a five-phase rail, the rotational connector 50 does not necessarily have to be equipped with contact elements 13 for contacting each conductor of a conductor device of such a rail and in particular not necessarily for contacting all electrical phases present on such a rail. For use with a five-phase rail, the rotational connector can also be equipped e.g. with six contact elements 13, or alternatively e.g. with four contact elements 13, for contacting a defined sub-group of the conductors.

Although the invention has been described in full above with the aid of preferred exemplified embodiments, it is not limited thereto but can be modified in diverse ways.

LIST OF REFERENCE SIGNS

2 assembly
3 rail
3*a* lower side (rail)
3*b* open region
3*c* longitudinal rib
3*c*' longitudinal rib
4 first region
5 second region
6 conductor device
6*a* operating current conductor (phase)
6*b* control signal conductor
6*c* operating current conductor (neutral)
6*d* basic body
7 adapter
7*v* protrusion (adapter)
11 lighting module
13 contact element
17 contact device
18 contact device
50 rotational connector
51 rotatable body
60 device for phase selection
61 component
62 component
63 component
64*a-c* electrically conductive component
65*a-f* contact element
71 housing component
72 housing component
73 aperture
74 opening
75 printed circuit board
80 holding device
81 mounting-rotational element
82 holding element
90 converter
300 operating and display region
310 actuatable selection device

320 display device
325 LED
D axis of rotation
M longitudinal middle plane
T depth direction (rail)
H7 height (adapter)
B7 width (adapter)
L7 length (adapter)

The invention claimed is:

1. An adapter for a lighting arrangement, wherein the adapter is designed to be introduced into a rail during formation of the lighting arrangement, to receive electrical energy from a conductor device provided in a region of the rail when the lighting arrangement is in an operating state, and to supply an assembly, which can be electrically coupled to the adapter during formation of the lighting arrangement, with electrical energy for the operation of light-generating devices in the operating state;

wherein the adapter comprises a rotational connector and, by means of a rotational movement of the rotational connector, the adapter can be electrically coupled to a plurality of electrical phases provided by the conductor device;

wherein the adapter comprises a device for phase selection, by means of which the assembly electrically coupled to the adapter can be electrically coupled to a selectable one of the phases provided by the conductor device and electrically coupled to the adapter; and wherein the adapter includes a converter, wherein, by means of the device for phase selection, the coupling of the assembly to the selectable phase can be brought about in such a way that the converter is coupled to the selectable phase in order to provide the electrical energy for the assembly using the selected phase.

2. The adapter as claimed in claim 1, wherein the rotational connector can be rotated about an axis of rotation in order to bring about or discontinue the electrical coupling of the adapter to the phases provided by the conductor device, the axis of rotation extending substantially in, or parallel to, a depth direction of the rail when the adapter is in an operation-ready installation state.

3. The adapter as claimed in claim 1, wherein, by means of the rotational movement of the rotational connector, the adapter can be electrically coupled simultaneously to the plurality of electrical phases provided by the conductor device.

4. The adapter as claimed in claim 1, wherein the device for phase selection is arranged for electronic selection of the phases to be coupled to the assembly.

5. The adapter as claimed in claim 1, wherein, on one side, of the adapter, which, in a state in which the adapter is inserted into the rail, points towards an open region of the rail, a selection device configured as a button or push-button switch, which can be actuated by an operator, is provided, by the actuation of which the electrical phase to be electrically coupled to the assembly can be selected or changed and/or the adapter can be brought into a state in which none of the phases provided by the conductor device and electrically coupled to the adapter is selected for electrical coupling to the assembly.

6. The adapter as claimed in claim 1, wherein the adapter comprises a display device, by means of which the phase—selected for electrical coupling to the assembly—of the phases provided by the conductor device and electrically coupled to the adapter can be displayed.

7. The adapter as claimed in claim 1, wherein, by means of the adapter, a control signal can also be transmitted to the assembly and/or the assembly can be actuated on the basis of the control signal received from the adapter, and wherein the adapter (7) is arranged to receive the control signal from the conductor device and to relay it to the assembly (2), or the adapter is arranged to receive the control signal from the conductor device and the adapter is designed with an electronic arrangement which makes it possible to interpret the received control signal and, in dependence upon the received control signal, to form a signal to be transmitted to the assembly in order to control the assembly.

8. The adapter as claimed in claim 1, wherein the assembly to which the adapter can be electrically coupled is designed as a lighting module or that at least one lighting unit is, or can be, coupled to the assembly and/or at least one lighting unit is, or can be, at least partially accommodated by the assembly.

9. The adapter as claimed in claim 1, wherein the adapter can be introduced into the rail from a lower side thereof when the rail is in the intended mounted state.

10. The adapter as claimed in claim 1, wherein the adapter is a component of a rail lighting system.

11. The adapter as claimed in claim 1, wherein the rotational connector comprises a plurality of contact elements, wherein the contact elements can be moved by means of the rotational movement from a non-contacting position into a protruding contacting position in which conductors of the conductor device can each be contacted by one of the contact elements, and in particular wherein the contact elements are movable jointly and simultaneously by means of the rotational movement between the non-contacting position and the contacting position.

12. The adapter as claimed in claim 11, wherein the conductors comprise a plurality of phase conductors.

13. The adapter as claimed in claim 11, wherein the conductors comprise one or a plurality of control signal conductors.

14. The adapter as claimed in claim 11, wherein positions of the conductors of the conductor device are symmetrical to a longitudinal middle plane of the rail and/or that conductors of the conductor device, formed as control signal conductors, are disposed opposite each other with respect to the longitudinal middle plane of the rail.

15. An adapter for a lighting arrangement, wherein the adapter is designed to be introduced into a rail during formation of the lighting arrangement, to receive electrical energy from a conductor device provided in a region of the rail when the lighting arrangement is in an operating state, and to supply an assembly, which can be electrically coupled to the adapter during formation of the light arrangement, with electrical energy for the operation of the light-generating devices in the operating state;

wherein the adapter comprises a rotational connector and, by means of a rotational movement of the rotational connector, the adapter can be electrically coupled to a plurality of electrical phases provided by the conductor device;

wherein the adapter comprises a device for the phase selection, by means of which the assembly electrically coupled to the adapter can be electrically coupled to a selectable one of the phases provided by the conductor device and electrically coupled to the adapter; and wherein the rotational connector comprises a plurality of contact elements, wherein the contact elements can be moved by means of the rotational movement from a non-contacting position into a protruding contacting position in which conductors of the conductor device can each be contacted by one of the contact elements, wherein the conductors comprise a plurality of phase conductors.

16. The adapter as claimed in claim 15, wherein the contact elements are movable jointly and simultaneously by means of the rotational movement between the non-contacting position and the protruding contacting position.

17. The adapter as claimed in claim 15, wherein the conductors comprise one or a plurality of control signal conductors.

18. An adapter for a lighting arrangement, wherein the adapter is designed to be introduced into a rail during formation of the lighting arrangement, to receive electrical energy from a conductor device provided in a region of the rail when the lighting arrangement is in an operating state, and to supply an assembly, which can be electrically coupled to the adapter during formation of the light arrangement, with electrical energy for the operation of the light-generating devices in the operating state;

wherein the adapter comprises a rotational connector and, by means of a rotational movement of the rotational connector, the adapter can be electrically coupled to a plurality of electrical phases provided by the conductor device;

wherein the adapter comprises a device for the phase selection, by means of which the assembly electrically coupled to the adapter can be electrically coupled to a selectable one of the phases provided by the conductor device and electrically coupled to the adapter;

wherein the rotational connector comprises a plurality of contact elements, wherein the contact elements can be moved by means of the rotational movement from a non-contacting position into a protruding contacting position in which conductors of the conductor device can each be contacted by one of the contact elements; and wherein positions of the conductors of the conductor device are symmetrical to a longitudinal middle plane of the rail and/or wherein conductors of the conductor device, formed as control signal conductors, are disposed opposite each other with respect to the longitudinal middle plane of the rail.

19. The adapter as claimed in claim 18, wherein the contact elements are movable jointly and simultaneously by means of the rotational movement between the non-contacting position and the contacting position.

20. The adapter as claimed in claim 18, wherein the conductors comprise a plurality of phase conductors and a neutral conductor.

* * * * *